United States Patent
Van Es et al.

(10) Patent No.: US 6,982,292 B2
(45) Date of Patent: Jan. 3, 2006

(54) USE OF HALOGENATED SULFONATES AS A STABILIZER BOOSTER IN PVC

(75) Inventors: Daniël Stephan Van Es, Bennekom (NL); Jacco Van Haveren, Ede Gld. (NL); Augustinus Emmanuel Frissen, Wageningen (NL); Johannes Cornelis Van Der Kolk, Heelsum (NL); Gerard Hubert Frans Schmets, AV Horn (NL); Hendrik Willem Huisman, Voerendaal (NL); Heather Blue Harvey, Velp (NL)

(73) Assignee: Akzo Nobel NV, (NL)

( * ) Notice: Subject to any disclaimer, the term of this patent is extended or adjusted under 35 U.S.C. 154(b) by 95 days.

(21) Appl. No.: 10/213,246

(22) Filed: Aug. 6, 2002

(65) Prior Publication Data

US 2003/0065072 A1  Apr. 3, 2003

Related U.S. Application Data

(60) Provisional application No. 60/312,641, filed on Aug. 15, 2001, provisional application No. 60/332,235, filed on Nov. 16, 2001.

(51) Int. Cl.
*C08K 5/42* (2006.01)

(52) U.S. Cl. .............. 524/157; 524/158; 524/159; 524/161; 524/164; 524/165; 524/166; 524/167; 524/567; 524/569

(58) Field of Classification Search ........... 524/157, 524/158, 159, 161, 164, 165, 166, 567, 569
See application file for complete search history.

(56) References Cited

U.S. PATENT DOCUMENTS

| | | | | |
|---|---|---|---|---|
| 4,806,571 A | * | 2/1989 | Knobel et al. .......... 521/107 |
| 4,957,947 A | * | 9/1990 | Chen et al. .............. 522/66 |
| 5,217,827 A | * | 6/1993 | Fauteux et al. ......... 429/310 |
| 5,472,639 A | * | 12/1995 | Yao .......................... 252/500 |
| 5,744,525 A | | 4/1998 | Harvey et al. ........... 524/84 |
| 5,965,206 A | * | 10/1999 | Hilti et al. ............ 427/393.1 |
| 6,310,128 B1 | | 10/2001 | Hilti et al. ............... 524/378 |
| 6,703,437 B1 | * | 3/2004 | Kamiyama et al. ..... 524/421 |

FOREIGN PATENT DOCUMENTS

| | | |
|---|---|---|
| EP | 751 179 A1 | 1/1997 |
| EP | 881 253 A1 | 12/1998 |
| JP | 02016133 | * 1/1990 |
| WO | 94/10113 | 5/1994 |

OTHER PUBLICATIONS

Derwent Abstract No. 97-054642/06 abstracting EP 751 179 A1.
March, J., Advanced Organic Chemistry, J. Power Sources (2001), 99(1-2), 41-47, fourth edition, pp. 18-19.
Abstract HCAPLUS 2001:556148.
Chemical Abstracts, vol. 85, 6301a (1976).
K.S. Minsker et al., "Stabilization of Poly(Vinyl Chloride) By β-Dicarbonyl Compounds", Eur. Polym, J., vol. 25, No. 12, pp. 1245-1250 (1989).

* cited by examiner

Primary Examiner—Bernard Lipman
(74) Attorney, Agent, or Firm—Louis A. Morris

(57) ABSTRACT

The invention relates to a process to make stabilized PVC wherein use is made of at least one compound of the formula

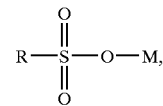

wherein M is selected from the group consisting of alkali metals, alkali earth metals, Al, and transition elements, and R is selected from the group consisting of substituted, linear or branched, alkyl, cycloalkyl, aryl, alkaryl, and aralkyl moieties, the substituents comprising at least one or more electron-withdrawing groups, as a color stability booster.

12 Claims, No Drawings

USE OF HALOGENATED SULFONATES AS A STABILIZER BOOSTER IN PVC

This application claims priority from U.S. Ser. No. 60/312,641, filed Aug. 15, 2001 and U.S. Ser. No. 60/332,235, filed Nov. 16, 2001.

The present invention relates to the use of halogenated sulfonates as a booster for color and/or heat stabilizers of poly vinyl chloride (PVC).

PVC has traditionally been stabilized with color and/or heat stabilizers in order to prevent discoloration and loss of properties during its processing and/or use. Conventional stabilizers include, but are not limited to, β-diketones, β-triketones, β-keto-esters, their enamines, dihydropyridines, and uracil derivatives. EP-A-0 881 253 lists some of these conventional stabilizers. Very often Zn-containing compounds are used as co-stabilizers to provide good stabilization properties. Lately there has been an interest in reducing the amount of Zn compounds in PVC. However, Zn-free stabilization systems often are not satisfactory with respect to the early color and color-hold of plastic articles.

Therefore, there is a need for new stabilizer systems for PVC. Preferably, said new stabilizer systems do not contain heavy metals.

Surprisingly, we have now found that a known class of compounds can be used to boost the performance of conventional heat and color stabilizers even when heavy metals and/or Zn are not present.

Accordingly, we claim the use of compounds of the formula I,

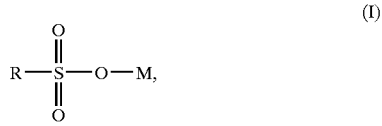

$$R-\underset{\underset{O}{\|}}{\overset{\overset{O}{\|}}{S}}-O-M, \quad (I)$$

wherein M is a metal and R is selected from the group consisting of substituted, linear or branched, alkyl, cycloalkyl, aryl, alkaryl, and aralkyl moieties, the substituents comprising at least one electron-withdrawing group, as a stability booster for heat- and/or color-stabilized PVC. Preferably, M is selected from the group consisting of alkali metals, alkali earth metals, Al, and transition elements, i.e. the elements with atom numbers 21–30, 39–48, 57–80, and 89 and higher. The electron-withdrawing group can be any conventional group that is known to draw electrons more than hydrogen does, as is defined in, for instance, *Advanced Organic Chemistry*, Ed. J. March, 4$^{th}$ ed, 1992, pp 18–19. In order to obtain exactly the desired amount of the stability booster in the final PVC resin composition it is highly preferred to use the compounds of formula I in a process wherein at least the stability booster is added to a PVC resin that is fully polymerized and that has preferably already been submitted to process steps to remove residual monomer.

It is noted that the use of triflates, products in accordance with formula (I), in PVC is known. In EP-A-0 751 179, for instance, it is described that these compounds, in combination with specific alkoxylated products, can be used to obtain anti-static PVC. Furthermore, it is disclosed in the abstract HCAPLUS 2001:556148 of the article entitled "Structural, thermal, and electrochemical cell characteristics of PVC-based polymer electrolytes" of S. Ramesh and A. K. Arof in *J. Power Sources* (2001), 99(1–2), 41–47, that combinations of $LiCF_3SO_3$, $LiBF_4$, ethylene carbonate, propylene carbonate, and PVC form a polymer electrolyte. However, these references do not disclose or suggest that the products of formula (I) are efficient boosters of color and/or heat stabilizers of PVC. Also the triflates are used in very large amounts, which is uneconomical. It is also preferred not to have alkoxylated compounds in the final stabilized PVC composition, preferably the alkoxylated compounds of EP-A-0 751 179 are not present, since they can affect the physical properties of the finished article produced with PVC compositions comprising them.

The products of formula (I) can be produced in conventional ways. Suitably, at least one of the electron-withdrawing groups is selected from the group consisting of F, Cl, Br, I, and $NO_2$. If more than one electron-withdrawing group is present in the molecule, said electron-withdrawing groups may be the same or different. More preferably, group R is fully substituted with electron-withdrawing groups, such as in trihalomethyl.

M is preferably selected from alkali metals, alkali earth metals, Al, and transition elements. Preferred transition elements are Fe, Zn, Mn, and rare earth metals. Of the rare earth metals, La and Ce are preferred. More preferably, M is selected from the group-consisting of Li, K, Na, Ca, Mg, Ba, Sr, Al, Fe, Zn, Mn, and La. Most preferably, M is selected from Li, K, Na, Zn, Ca, Ba, and Sr. Preferred very efficient and easily accessible stabilizer boosters according to the invention are the salts of trifluoromethanesulfonic acid, also known as triflates. Other preferred stabilizer boosters are polyfluoroalkylsulfonates, particularly pentafluoroethylsulfonates and heptadecafluorooctylsulphonate.

The amount of the stabilizer booster that is to be used can vary widely, depending on the stabilized resin composition in which it is used. Especially the type and quantity of stabilizer in the resin composition are expected to influence the amount of stabilizer booster needed to obtain an effect. For the purpose of this invention, an effect is considered to be present if the heat and/or color stability of the stabilized resin is better than in a corresponding composition without the stabilizer booster. Preferably, the stabilizer booster is used in an amount of 0.1–50 percent by weight based on the total amount of (co)stabilizer that is used (% w/w). More preferably, the stabilizer booster is used in an amount of 1–25% w/w. Alternatively, the amount of stabilizer booster is based on the weight of the resin in which it is to be used. In that case, it is suitably used in an amount of 0.001–1.0 parts, preferably 0.002–0.8 parts, more preferably 0.005–0.5 parts, all based on 100 parts of PVC resin.

The stabilizer booster can be used as such or in the form of a mixture with one or more further additives to be used in the final resin composition. Preferably said further additives are inert towards the stabilizer booster or raw materials that can form the stabilizer booster. The use of mixtures can be preferred since they can facilitate handling and increase dosing accuracy, especially in view of the very small amounts of the stabilizer booster that is needed. Accordingly, the stabilizer booster may, for example, be incorporated into a stabilizer formulation that is used. Good results have been achieved by incorporating the stabilizer booster into a conventional liquid stabilizer formulation as used for flexible PVC grades. The pre-blend may also be in the form of a masterbatch, wherein the stabilizer booster is mixed with the resin in which it can be used. Such a masterbatch suitably contains one or more further additives.

It is noted that one or more of the ingredients of the mixture, pre-blend, or masterbatch may be formed in-situ by contacting suitable raw materials that form said desired ingredient(s). For example, it can be advantageous to combine a metal source, such as NaOH, or any other suitable source, including oxides, neat metals, salts, etc., and triflic acid with further additives, to form a mixture comprising sodium triflate. In such a case, it can be advantageous, to store the mixture for a certain period of time to ensure that sufficient of the raw materials have reacted. The final mixtures/pre-blends can be a solid or a liquid formulation, depending on the ingredients used. It can be preferred to produce a conventional liquid stabilizer system comprising one or more of the stabilizer boosters of the present invention. In such a liquid stabilizer system, it can be preferred to make one or more of the ingredients of the liquid stabilizer mixture in situ by combining the appropriate raw materials. If such an in-situ process is used to make mixtures, pre-blends, or masterbatches, preferably at least the stabilizer booster is produced in-situ.

It is noted that the amount of stabilizer booster can be reduced if the resin also comprises one or more metal oxides and/or metal hydroxides, particularly alkali (earth) (hydr) oxides. Ca and/or Zn (hydr)oxides, such as $Ca(OH)_2$ are preferred. Therefore, the use of combinations of the stabilizer booster and such (hydr)oxides may be preferred. If so, the amount of metal (hydr)oxide used suitably is 0.01–5 parts, preferably 0.05–2 parts, more preferably 0.1–1 parts, all based on 100 parts of resin.

It is noted that the term "PVC" as used throughout this document is meant to denominate all (co)polymers comprising vinyl chloride monomeric units, including but not limited to various copolymers and chlorinated vinyl chloride polymers. Preferred are conventional PVC grades that are not chlorinated and typically comprise more than 90% vinyl chloride, as are obtainable by mass, suspension, micro-suspension, and emulsion polymerization processes. The PVC is preferably not a latex since that will contain high amounts of emulsifiers. Accordingly, the most preferred vinyl chloride (co)polymers include conventional flexible, semi-rigid, and rigid grades of PVC wherein emulsifying agents are preferably present in a low amount, e.g. to improve the electrical properties of the PVC. Therefore, it is preferred to use PVC obtained by a suspension or mass polymerization process. Alternatively, PVC from an emulsion polymerization can be used, provided that it is freed from said undesired emulsifiers.

It is furthermore to be understood that the term "stabilized PVC" relates to any PVC composition containing one or more conventional solid or liquid color and/or heat stabilizers. In a first preferred embodiment, it relates to rigid PVC formulations comprising an effective amount of one or more metal-free stabilizers, such as uracils and β-aminocrotonic acid esters, and/or one or more products that some refer to as co-stabilizers, but which can be used as such if so desired. Said co-stabilizers include phosphites, epoxides, polyols, enamines, anti-oxidants, β-diketones, dihydropyridine, and β-ketocarboxylic acid esters. In a second, equally preferred embodiment, the term "stabilized PVC" relates to flexible grades PVC that is stabilized with an effective amount of a conventional liquid stabilizer system. Preferably, such a liquid system comprises at least a metal soap.

An effective stabilizing amount of said stabilizers is comprised in the stabilized PVC according to the invention. In general, this means that an amount of 0.01–15 parts is used per 100 parts of (co)polymer to be stabilized.

It is noted that throughout this document the word "parts" means parts by weight and that the abbreviation "phr" is used for the expression "parts per 100 parts of PVC."

Preferably, an amount of 0.05–10 phr, more preferably 0.1–7 phr, even more preferably 0.2–5 phr, most preferably about 0.5–4 phr, is used.

Experimental

A first set of tests was performed using the following recipe:

| Specification | Amount [parts by weight] |
|---|---|
| S-PVC (Marvylan ® S-6806 ex LVM.) | 100 |
| chalk (Omyalite ® 95T ex Omya GmbH) | 3.0 |
| calcium stearate (HaroChem ® CGN ex Akcros) | 0.30 |
| lime $(Ca(OH)_2$ | 1.10 |
| hydrotalcite, Alkamiser ® I ex Kyowa | 0.10 |
| butanediyl-1,4-bis(β-aminocrotonate) ex LONZA | 0.40 |
| β-(3,5-di-tert-butyl-4-hydroxyphenyl)-propionic acid-n-octadecyl ester (Lankomark ® LE-384 ex Akcros) | 0.10 |
| titanium dioxide (Kronos ® 2220 ex Kronos Titan) | 0.20 |
| synthetic paraffin (ex Castor and Astor) | 0.45 |
| polyethylene wax (ex BASF) | 0.40 |
| oxidized polyethylene wax (ex Allied Chemicals) | 0.05 |
| natural paraffin (ex Schuemann) | 0.20 |
| stabilizer booster and optional further ingredients | see Examples |

A composition of in total about 150 g was mixed by hand and subsequently homogenized on a rolling mill with a friction of 10%, meaning that one roll runs 10% faster than the other roll, during 3.5 minutes at 217° C. After the milling time, the samples were removed as sheets of about 0.4 mm thickness. Subsequently, the thermal stability of the sheets was determined by evaluating testing strips of 15 mm×250 mm that were cut directly from the sheet using a Mathis Thermotester Type LTE-T at 200° C. in accordance with testing method DIN 53381-PVC-F. The strips were gradually pulled from the thermotester in the usual way. The stability of the samples was determined visually by either checking the time at which degradation occurred or by determining the color of the PVC that had been in the oven for a certain period of time. A color scale ranging from black (worst), brown, orange, yellow, cream, to off-white (best) was used to classify the color of the PVC after the test.

EXAMPLE 1 AND COMPARATIVE EXAMPLE A

In Example 1 the formulation further comprised 0.3 phr of sorbitol and 0.03 phr of Li-trifluoromethanesulfonic acid. After milling, the sheet was light yellow. The part of a test strip that had been in the oven for 17.5 minutes showed very little discoloration and was still light yellow. Only after about 22.5 minutes did a discoloration to orange occur. In a comparative example, 0.4 phr of sorbitol and an extra amount of 0.2 phr of the stabilizer 1,4-dihydropyridine-2,6-dimethyl-3,5-diethyldicarboxylate were further comprised in the formulation. After milling the sheet was light yellow. However, after 17.5 minutes in the oven the color changed to orange and after 22.5 minutes in the oven the strip was brown.

EXAMPLES 2–4 AND COMPARATIVE EXAMPLES B–D

In this second set of tests the following formulation was used:

| Specification | Amount [parts by weight] |
|---|---|
| S-PVC (Vinoflex ® S-6815 ex BASF) | 100 |
| chalk (Omyalite ® 95T ex Omya GmbH) | 2.0 |
| calcium stearate (HaroChem ® CGN ex Akcros) | 0.60 |
| Lubricants (Interwax GP 08/27/01/02/21) | 1.72 |
| titanium dioxide (Kronos ® 2220 ex Kronos Titan) | 0.10 |
| stabilizer booster and optional further ingredients | see Examples |

A composition of in total about 150 g was mixed by hand and subsequently homogenized on a rolling mill with a friction of 10% during 5 minutes at 195° C. After the milling time, the samples were removed as sheets of about 0.4 mm thickness. Subsequently, the thermal stability of the sheets was determined by testing particles cut from the strips in accordance with Congo-red method DIN 53381-PVC-A at 200° C.

The following results were obtained:

| Example | Further ingredients | | Time (minutes) |
|---|---|---|---|
| B | Zeolite (Wessalith ® P ex Degussa) | 0.65 phr | 11.7 |
|   | Sorbitol | 0.17 phr | |
|   | 1,4-dihydropyridine-2,6-dimethyl-3,5-dibenzyl dicarboxylate | 0.20 phr | |
| 2 | see B + Li-trifluoromethane-sulfonic acid | 0.03 phr | 16.3 |
| C | Zeolite (Wessalith ® P ex Degussa) | 0.65 phr | 13.2 |
|   | Trimethylol propane | 0.40 phr | |
|   | Lime (Ca(OH)$_2$ | 0.20 phr | |
|   | Butanediyl-1,4-bis(β-amino-crotonate) | 0.25 phr | |
| 3 | see C + Li-trifluoromethane-sulfonic acid | 0.03 phr | 23.7 |
| D | Zeolite 4A (Wessalith ® P ex Degussa) | 0.65 phr | 14.75 |
|   | Sorbitol | 0.17 phr | |
|   | Lime (Ca(OH)$_2$ | 0.20 phr | |
|   | 1,4-dihydropyridine-2,6-dimethyl-3,5-dibenzyl dicarboxylate | 0.20 phr | |
| 4 | see D + Li-trifluoromethane-sulfonic acid | 0.03 phr | 21.8 |

EXAMPLES 5–10

In the following recipe some further compounds of formula (I) were evaluated as a stabilizer booster.

| Specification | Amount [parts by weight] |
|---|---|
| S-PVC (Marvilan ® S-6806 ex LVM) | 100 |
| chalk (Omyalite ® 95T ex Omya GmbH) | 2.0 |
| calcium stearate (HaroChem ® CGN ex Akcros) | 0.30 |
| β-(3,5-di-tert-butyl-4-hydroxyphenyl)-propionic acid-n-octadecyl ester (Lankomark ® LE-384 ex Akcros) | 0.10 |
| Lubricants (Interwax GP 40/27/01/02/31) | 1.2 |
| titanium dioxide (Kronos ® 2220 ex Kronos Titan) | 0.20 |
| Sorbitol | 0.20 |
| Zeolite 4A (Wessalith ® P ex Degussa) | 0.70 |
| 1,4-dihydropyridine-2,6-dimethyl-3,5-dibenzyl dicarboxylate | 0.20 |
| stabilizer booster | 0.03 |

In Examples 5–10 lanthanum trifluoromethane sulfonate, lithium trifluoromethane sulfonate, lithium heptadecafluorooctane sulfonate (0.12 parts of a 25% by weight aqueous solution), potassium fluorosulfonate, sodium trifluoromethane sulfonate, and zinc trifluoromethane sulfonate, respectively, were tested as set out under experimental. All these products boosted the performance of the color stabilizers in the formulation. Potassium fluorosulfonate performed less well than the other 5 compounds.

EXAMPLES 11 and 12 AND COMPARATIVE EXAMPLES E–H

In examples 11, E and F the following clear flexible PVC formulation was used:

| Specification | Amount [parts by weight] |
|---|---|
| Solvic 264 PC ex Solvin | 100 |
| Di isodecyl phthalate (JAYFLEX DIDP ex Exxon) | 45 |
| Ethoxylated soy bean oil, Lankroflex ® E2307 ex Akcros | 3 |
| Stearic acid | 0.25 |
| stabilizer system | see below |

In examples 12, G and H the following white flexible PVC formulation was used:

| Specification | Amount [parts by weight] |
|---|---|
| Solvic 264 PC ex Solvin | 100 |
| Di isodecyl phthalate | 27.5 |
| Ethoxylated soy bean oil, Lankroflex ® E2307 ex Akcros | 3 |
| Stearic acid | 0.25 |
| titanium dioxide (Kronos ® 2220 ex Kronos Titan) | 5.0 |
| stabilizer system | see below |

A composition of in total about 150 g was mixed by hand and subsequently homogenized on a rolling mill with a friction of 10% during 4 minutes at 165° C. After the milling time, the samples were removed as sheets of about 0.4 mm thickness and the color of the sheets was determined in the conventional way by measuring the Yellowness Index (YI)

The stabiliser system used in the examples was as follows:

| Stabilizer system | Amount [parts by weight] |
|---|---|
| Diphenylisooctylphosphite (Lankromark ® EL98 ex Akcros) | 1.341 |
| Diphenyl phosphite (Lankromark ® DPP ex Akcros) | 0.1 |

-continued

| Stabilizer system | Amount [parts by weight] |
|---|---|
| Overbased Zn octoate (Lankromark ® LZK440 ex Akcros) | 0.24 |
| Carbonated Ba intermediate Lubrizol ® 2106 ex OMG | 0.759 |
| Butoxyethoxyethanol (Butyl dioxitol ex BP-Amoco) | 0.54 |
| Additive* | 0.02 |

*In Examples 11 and 12 the additive was triflic acid. In Comparative Examples E and G the additive was butoxyethoxyethanol (an inert solvent) In Comparative Examples F and H the additive was a conventional betadiketone color improver N-phenyl-3-acetyl pyrrolidine-2,4-dione which can be produced as described in U.S. Pat. No. 5,744,525.

The stabilizer system was produced 1 day prior to mixing it in the PVC formulation. The trflic acid reacted in-situ with the overbased metals of the recipe to form a stabilizer booster according to the invention.

The following results were obtained:

| Example | YI |
|---|---|
| 11 | 6.1 |
| E | 7.5 |
| F | 5.6 |
| 12 | 2.4 |
| G | 4.2 |
| H | 2.1 |

From these results it follows that the triflic acid salt effectively boosts the effectiveness of the color stabilizers in the formulation. The overall performance of the triflate was comparable with that of a conventional color improver.

What is claimed is:

1. A process to boost a stabilizer in a heat and/or color-stabilized PVC resin composition wherein at least one compound of the formula

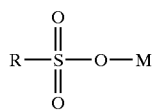

(I)

is added to the PVC resin composition, wherein M is a metal, and R is selected from the group consisting of substituted, linear or branched, alkyl, cycloalkyl, aryl, alkaryl, and aralkyl moieties, the substituents comprising at least one or more electron-withdrawing groups, and the PVC resin composition comprising a (co)stabilizer comprising one or more compounds selected from the group consisting of phosphites, epoxides, polyols, enamines, betadiketones, dihydropyridine, beta-ketocarboxylic acid esters, uracils and β-aminocrotonic acid esters, Zn not being present in said PVC resin composition.

2. The process of claim 1 wherein M is selected from the group consisting of alkali metals, alkali earth metals, Al, and transition elements.

3. The process of claim 1 wherein the electron-withdrawing groups are independently selected from the group consisting of F, Cl, Br, I, and $NO_2$.

4. The process of claim 1 wherein group R is fully substituted with one or more of the electron-withdrawing groups of claim 3.

5. The process of claim 1 wherein the stabilizer boosting compound (I) is used in a PVC composition that also comprises an alkali (earth) metal (hydr)oxide, preferably $Ca(OH)_2$.

6. The process of claim 5 wherein said alkali (earth) metal (hydr)oxide comprises $Ca(OH)_2$.

7. The process of claim 1 wherein the stabilizer boosting compound (I) is added to the resin as a mixture with one or more further additives to be used in the final resin composition.

8. The process of claim 1 wherein said PVC resin composition is free of alkoxylated compounds and comprises at least 0.005 parts of the stabilizer booster of formula (I) per 100 parts PVC.

9. The process of claim 1 wherein the compound(s) of formula (I) is produced in-situ by incorporating the raw materials to form said compound(s) in a mixture of at least one compound of formula (I) and one or more further conventional additives for resins.

10. A heat and/or color-stabilized PVC resin formulation comprising at least one stabilizer booster of the formula

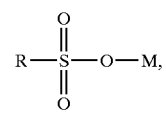

(I)

wherein M is a metal, and R is selected from the group consisting of substituted, linear or branched, alkyl, cycloalkyl, aryl, alkaryl, and aralkyl moieties, the substituents comprising at least one or more electron-withdrawing groups, and co-stabilizers comprising one or more compounds selected from the group consisting of phosphites, epoxides, polyols, enamines, betadiketones, dihydropyridine, beta-ketocarboxylic acid esters, uracils and β-aminocrotonic acid esters, Zn not being present in said PVC resin composition, and, optionally, one or more further conventional additives for resins, wherein the stabilizer booster is used in an amount of 1–50 percent by weight based on the total amount of (co)stabilizer that is used.

11. A PVC mixture not being a final resin composition comprising at least one stabilizer booster of the formula

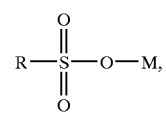

(I)

and one or more (co)stabilizers selected from the group consisting of phosphites, epoxides, polyols, enamines, betadiketones, dihydropyridine, beta-ketocarboxylic acid esters, uracils and β-aminocrotonic acid esters, Zn not being present in said PVC mixture.

12. The PVC mixture of claim 11 wherein the compound(s) of formula (I) is produced in-situ by incorporating the raw materials to form said compound(s) in said mixture.

* * * * *